United States Patent
Takigawa et al.

(10) Patent No.: US 9,005,470 B2
(45) Date of Patent: Apr. 14, 2015

(54) REFRIGERATING MACHINE OIL AND WORKING FLUID COMPOSITION FOR REFRIGERATING MACHINES

(75) Inventors: Katsuya Takigawa, Tokyo (JP); Masanori Saito, Tokyo (JP); Takeshi Okido, Tokyo (JP); Kuniko Takahashi, Tokyo (JP)

(73) Assignee: JX Nippon & Energy Corporation, Tokyo (JP)

( * ) Notice: Subject to any disclaimer, the term of this patent is extended or adjusted under 35 U.S.C. 154(b) by 166 days.

(21) Appl. No.: 13/818,170

(22) PCT Filed: Aug. 5, 2011

(86) PCT No.: PCT/JP2011/067970
§ 371 (c)(1),
(2), (4) Date: Apr. 24, 2013

(87) PCT Pub. No.: WO2012/026303
PCT Pub. Date: Mar. 1, 2012

(65) Prior Publication Data
US 2013/0207024 A1   Aug. 15, 2013

(30) Foreign Application Priority Data

Aug. 24, 2010  (JP) ................................. 2010-187577
May 11, 2011  (JP) ................................. 2011-106387

(51) Int. Cl.
C09K 5/04    (2006.01)
C10M 101/00  (2006.01)
C10M 171/00  (2006.01)

(52) U.S. Cl.
CPC .................. *C10M 1/00* (2013.01); *C09K 5/045* (2013.01); *C09K 2205/126* (2013.01); *C10M 171/008* (2013.01); *C10M 2207/026* (2013.01); *C10M 2207/042* (2013.01); *C10M 2207/281* (2013.01); *C10M 2207/2835* (2013.01); *C10M 2223/041* (2013.01); *C10M 2223/047* (2013.01); *C10N 2220/302* (2013.01); *C10N 2230/02* (2013.01); *C10N 2230/06* (2013.01); *C10N 2240/30* (2013.01); *C09K 2205/22* (2013.01); *C09K 2205/24* (2013.01); *C10N 2220/303* (2013.01); *C10N 2220/306* (2013.01)

(58) Field of Classification Search
CPC ........ C09K 5/04; C09K 5/045; C10M 105/34
USPC ............................................. 252/68; 508/532
See application file for complete search history.

(56) References Cited

U.S. PATENT DOCUMENTS

| 5,593,957 | A | 1/1997 | Obara et al. |
| 5,820,777 | A * | 10/1998 | Schnur et al. ................... 252/68 |
| 6,667,285 | B1 | 12/2003 | Kawahara et al. |

FOREIGN PATENT DOCUMENTS

| EP | 0430657 | | 6/1991 |
| EP | 430657 A1 | * | 6/1991 |
| EP | 448402 A2 | * | 9/1991 |
| EP | 0 568 348 A1 | | 11/1993 |
| EP | 0 568 350 A1 | | 11/1993 |
| EP | 0 612 839 A1 | | 8/1994 |
| JP | 2-242888 A | | 9/1990 |
| JP | 3-200895 A | | 9/1991 |
| JP | 3-217495 A | | 9/1991 |
| JP | 3-227397 A | | 10/1991 |
| JP | 6-17073 A | | 1/1994 |
| JP | 6-128578 A | | 5/1994 |
| JP | 7-70577 A | | 3/1995 |
| JP | 8-295892 A | | 11/1996 |
| JP | 10-298572 A | | 11/1998 |
| JP | 2002-60771 A | | 2/2002 |
| JP | 2002-105471 A | | 4/2002 |
| JP | 2002-129177 A | | 5/2002 |
| JP | 2002-129178 A | | 5/2002 |
| JP | 2002-129179 A | | 5/2002 |
| WO | 2006/094303 A2 | | 9/2006 |

OTHER PUBLICATIONS

Extended European Search Report issued with respect the European Application No. 11819767.2, mail date is Feb. 4, 2014.
Search report from International Application No. PCT/JP2011/067970, mail date is Oct. 18, 2011.
International Preliminary Report on Patentability Application No. PCT/JP2011/067970, mail date is Mar. 28, 2013.

\* cited by examiner

*Primary Examiner* — Douglas McGinty
(74) *Attorney, Agent, or Firm* — Greenblum & Bernstein, P.L.C.

(57) ABSTRACT

The refrigerating machine oil of the invention includes an ester of a polyhydric alcohol and a fatty acid, wherein the molar ratio of $C_4$-$C_6$ fatty acid and $C_7$-$C_9$ branched fatty acid in the fatty acid is between 15:85 and 90:10, the $C_4$-$C_6$ fatty acid includes 2-methylpropanoic acid, and the ratio of the total $C_4$-$C_6$ fatty acid and $C_7$-$C_9$ branched fatty acid in the total fatty acids composing the ester is at least 20 mol %. The working fluid composition for a refrigerating machine according to the invention comprises the refrigerating machine oil, a difluoromethane refrigerant and/or an unsaturated fluorinated hydrocarbon refrigerant.

9 Claims, No Drawings

REFRIGERATING MACHINE OIL AND WORKING FLUID COMPOSITION FOR REFRIGERATING MACHINES

TECHNICAL FIELD

The present invention relates to a refrigerating machine oil and a working fluid composition for refrigerating machines, and specifically it relates to a refrigerating machine oil that is useful when used in combination with difluoromethane refrigerants (HFC-32), unsaturated fluorinated hydrocarbons and the like, as well as a working fluid composition for refrigerating machines that employs the refrigerating machine oil.

BACKGROUND ART

In light of the problem of ozone layer depletion that has become a focus of attention in recent years, the restrictions on CFCs (chlorofluorocarbons) and HCFCs (hydrochlorofluorocarbons) that are used as refrigerants in conventional refrigerating machines have become more stringent, and HFCs (hydrofluorocarbons) are coming into use as substitute refrigerants.

Mineral oils or hydrocarbon oils such as alkylbenzenes have been preferred for use as refrigerating machine oils when CFCs or HCFCs are used as refrigerants, but since changing the refrigerant can cause the refrigerating machine oil used with it to exhibit unpredictable behavior in terms of its compatibility with the refrigerant, its lubricity, its dissolved viscosity with the refrigerant and its thermal and chemical stability, it has been necessary to develop different refrigerating machine oils for different refrigerants. Examples of refrigerating machine oils that have been developed for HFC refrigerants include polyalkylene glycols (see Patent document 1), esters (see Patent document 2), carbonic acid esters (see Patent document 3) and polyvinyl ethers (see Patent document 4). Of the refrigerating machine oils mentioned above, esters are most widely used for refrigerators and air conditioning units.

Among HFC refrigerants, HFC-134a, R407C and R410A are routinely used as refrigerants for automobile air conditioners, refrigerators and room air conditioners. However, while these HFC refrigerants have ozone depletion potentials (ODP) of zero, their high global warming potentials (GWP) have led to their gradual restriction. It has therefore become an urgent issue to develop refrigerants as substitutes for such HFCs.

In light of this background it has been proposed to use, as substitute refrigerants for HFCs, fluoropropene refrigerants which have very low ODP and GWP, are noncombustible and are comparable or superior to HFCs in terms of their thermodynamic properties, as a measure of refrigerant performance. There has also been proposed the use of refrigerant mixtures of fluoropropene with saturated hydrofluorocarbons, C3-5 saturated hydrocarbons, dimethyl ether, carbon dioxide, bis(trifluoromethyl)sulfide or trifluoroiodomethane (see Patent document 5). In addition, difluoromethane refrigerants (HFC-32) are attracting attention as HFC refrigerants with relatively low global warming potential and high refrigerating efficiency.

Incidentally, one of the performance aspects required for a refrigerating machine oil is compatibility with refrigerants used in combination. Advances are therefore proceeding in the development of refrigerating machine oils suited for difluoromethane refrigerants or unsaturated fluorinated hydrocarbon refrigerants, when such refrigerants are to be used.

For example, a refrigerating machine oil serving to lubricate a refrigerant compressor generally must have compatibility with refrigerants in order for the refrigerating machine oil to be circulated in the cycle together with the refrigerant. However, when refrigerating machine oils that are conventionally employed as HFC refrigerants are used with difluoromethane refrigerants, the compatibility between the refrigerant and refrigerating machine oil is not sufficient, and the refrigerating machine oil ejected from the refrigerant compressor tends to pool in the cycle, resulting in a reduced amount of refrigerating machine oil in the refrigerant compressor and thus poor lubrication, and blocking of the expansion mechanism including capillaries. Refrigerating machine oils for difluoromethane refrigerants are being developed with the goal of avoiding this phenomenon, and for example, ester-based refrigerating machine oils have been proposed, including the refrigerating machine oils for difluoromethane refrigerants disclosed in Patent documents 6 to 12.

CITATION LIST

Patent Literature

[Patent document 1] Japanese Unexamined Patent Application Publication HEI No. 02-242888
[Patent document 2] Japanese Unexamined Patent Application Publication HEI No. 03-200895
[Patent document 3] Japanese Unexamined Patent Application Publication HEI No. 03-217495
[Patent document 4] Japanese Unexamined Patent Application Publication HEI No. 06-128578
[Patent document 5] International Patent Publication No. WO2006/094303
[Patent document 6] Japanese Unexamined Patent Application Publication HEI No. 6-17073
[Patent document 7] Japanese Unexamined Patent Application Publication HEI No. 10-298572
[Patent document 8] Japanese Unexamined Patent Application Publication No. 2002-060771
[Patent document 9] Japanese Unexamined Patent Application Publication No. 2002-105471
[Patent document 10] Japanese Unexamined Patent Application Publication No. 2002-129177
[Patent document 11] Japanese Unexamined Patent Application Publication No. 2002-129178
[Patent document 12] Japanese Unexamined Patent Application Publication No. 2002-129179

SUMMARY OF INVENTION

Technical Problem

Even conventional ester-based refrigerating machine oils, however, cannot always exhibit adequate performance when used in combination with difluoromethane refrigerants and unsaturated fluorinated hydrocarbons. When conventional ester-based refrigerating machine oils are used in combination with difluoromethane refrigerants, in particular, it is extremely difficult to both achieve compatibility with the difluoromethane refrigerants while ensuring the viscosity necessary as a refrigerating machine oil. Among conventional ester-based refrigerating machine oils, for example, those that exhibit satisfactory compatibility with difluoromethane refrigerants tend to have unsatisfactory lubricity in the presence of difluoromethane refrigerants.

The present invention has been accomplished in light of the aforementioned problems of the prior art, and its object is to provide a refrigerating machine oil that allows high levels to be achieved for refrigerant compatibility, lubricity and low-temperature flow properties when it is used together with difluoromethane refrigerants, unsaturated fluorinated hydrocarbons and the like, as well as a working fluid composition for a refrigerating machine using the same.

Solution to Problem

In order to solve the problems described above, the invention provides a refrigerating machine oil comprising an ester of a polyhydric alcohol and a fatty acid, wherein the molar ratio of $C_4$-$C_6$ fatty acid and $C_7$-$C_9$ branched fatty acid in the fatty acid is between 15:85 and 90:10, the $C_4$-$C_6$ fatty acid includes 2-methylpropanoic acid, and the ratio of the total $C_4$-$C_6$ fatty acid and $C_7$-$C_9$ branched fatty acid in the total fatty acid composing the ester is at least 20 mol %.

In the refrigerating machine oil of the invention, the ratio of 2-methylpropanoic acid in the $C_4$-$C_6$ fatty acid is preferably at least 20 mol %.

Also, in the refrigerating machine oil of the invention, the $C_4$-$C_6$ fatty acid preferably is 2-methylpropanoic acid.

Also preferably, the polyhydric alcohol in the refrigerating machine oil of the invention is pentaerythritol and the 40° C. kinematic viscosity of the refrigerating machine oil is 20 to 80 $mm^2$/s.

Even more preferably, the $C_7$-$C_9$ branched fatty acid in the refrigerating machine oil of the invention is 3,5,5-trimethylhexanoic acid.

The invention further provides a working fluid composition for a refrigerating machine that comprises the refrigerating machine oil of the invention and a difluoromethane refrigerant.

The invention still further provides a working fluid composition for a refrigerating machine that comprises the refrigerating machine oil of the invention and an unsaturated fluorinated hydrocarbon refrigerant.

The invention still further provides a working fluid composition for a refrigerating machine that comprises the refrigerating machine oil of the invention, a difluoromethane refrigerant and an unsaturated fluorinated hydrocarbon refrigerant. The mass ratio of the difluoromethane refrigerant and unsaturated fluorinated hydrocarbon refrigerant in this case is between 95:5 and 50:50.

Advantageous Effects of Invention

According to the invention there is provided a refrigerating machine oil that allows high levels to be achieved for refrigerant compatibility, lubricity and low-temperature flow properties when it is used together with difluoromethane refrigerants, unsaturated fluorinated hydrocarbons and the like, as well as a working fluid composition for a refrigerating machine using the same.

DESCRIPTION OF EMBODIMENTS

Preferred embodiments of the invention will now be described in detail.

The refrigerating machine oil of this embodiment is a refrigerating machine oil comprising an ester of a polyhydric alcohol and a fatty acid, which is an ester wherein the molar ratio of $C_4$-$C_6$ fatty acid and $C_7$-$C_9$ branched fatty acid in the fatty acid is between 15:85 and 90:10, the $C_4$-$C_6$ fatty acid includes 2-methylpropanoic acid, and the ratio of the total of $C_4$-$C_6$ fatty acid and $C_7$-$C_9$ branched fatty acid in the total fatty acid composing the ester is at least 20 mol % (hereunder referred to as "polyhydric alcohol fatty acid ester (A)").

The polyhydric alcohol fatty acid ester (A) includes complete esters wherein the all of the hydroxyl groups of the polyhydric alcohol are esterified, partial esters wherein some of the hydroxyl groups of the polyhydric alcohol remain without being esterified, and mixtures of complete esters and partial esters, but the hydroxyl value of the polyhydric alcohol fatty acid ester (A) is preferably no greater than 10 mgKOH/g, more preferably no greater than 5 mgKOH/g and most preferably no greater than 3 mgKOH/g.

Of the fatty acids composing the polyhydric alcohol fatty acid ester (A), the molar ratio of $C_4$-$C_6$ fatty acid and branched $C_7$-$C_9$ fatty acid is 15:85 to 90:10, preferably 15:85 to 85:15, more preferably 20:80 to 80:20, even more preferably 25:75 to 75:25 and most preferably 30:70 to 70:30. The ratio of the total of $C_4$-$C_6$ fatty acid and branched $C_7$-$C_9$ fatty acid with respect to the total fatty acids composing the polyhydric alcohol fatty acid ester (A) is at least 20 mol %. If this condition for the fatty acid composition is not satisfied, it will be difficult to achieve high levels for both adequate compatibility with difluoromethane refrigerants and the viscosity necessary as a refrigerating machine oil. The ratio of fatty acids, for the purpose of the invention, is the value based on the total fatty acids composing the polyhydric alcohol fatty acid ester in the refrigerating machine oil.

Specific examples of $C_4$-$C_6$ fatty acid include butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid and hexanoic acid. Acids with branching in the alkyl backbone, such as 2-methylpropanoic acid, are preferred.

Specific examples of branched $C_7$-$C_9$ fatty acid include 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methyiheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid and 2,2-diisopropylpropanoic acid.

The polyhydric alcohol fatty acid ester (A) has a molar ratio of $C_4$-$C_6$ fatty acid and branched $C_7$-$C_9$ fatty acid of 15:85 to 90:10, and it may include fatty acids other than $C_4$-$C_6$ fatty acid and branched $C_7$-$C_9$ fatty acid as constituent acid components, so long as the $C_4$-$C_6$ fatty acid include 2-methylpropanoic acid.

Specific fatty acids other than $C_4$-$C_6$ fatty acid and branched $C_7$-$C_9$ fatty acid include $C_2$-$C_3$ fatty acid such as acetic acid and propionic acid; $C_7$-$C_9$ straight-chain fatty acid such as heptanoic acid, octanoic acid and nonanoic acid; and $C_{10}$-$C_{20}$ fatty acid such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid and oleic acid.

When a $C_4$-$C_6$ fatty acid and a branched $C_7$-$C_9$ fatty acid are to be used in combination with a fatty acid other than such fatty acids, the ratio of the total of $C_4$-$C_6$ fatty acid and $C_7$-$C_9$ branched fatty acid with respect to the total fatty acids composing the polyhydric alcohol fatty acid ester (A) must be at least 20 mol %, but it is preferably at least 25 mol % and more preferably at least 30 mol %. If this ratio is at least 20 mol %, the compatibility with difluoromethane refrigerants will be sufficient.

A polyhydric alcohol fatty acid ester (A) wherein the acid components are 2-methylpropanoic acid and 3,5,5-trimethylhexanoic acid is particularly preferred from the viewpoint of both ensuring the necessary viscosity and obtaining compatibility with difluoromethane refrigerants.

The polyhydric alcohol fatty acid ester of this embodiment may be a mixture of 2 or more different esters with different molecular structures, in which case the individual molecules do not necessarily have to satisfy the aforementioned conditions, and it is sufficient if the conditions are satisfied comprehensively by the fatty acids composing the pentaerythritol fatty acid ester in the refrigerating machine oil.

As mentioned above, the polyhydric alcohol fatty acid ester (A) comprises a $C_4$-$C_6$ fatty acid and a branched $C_7$-$C_9$ fatty acid as essential acid components of the ester, and if necessary may comprise other fatty acids as constituent components. That is, the polyhydric alcohol fatty acid ester (A) may comprise only 2 different fatty acids as constituent acid components, or it may have 3 or more different fatty acids with different structures as constituent acid components, but the constituent acid components of the polyhydric alcohol fatty acid ester are preferably only fatty acids in which the carbon atom adjacent to the carbonyl carbon (the α-position carbon atom) is not a quaternary carbon. When the fatty acids composing the polyhydric alcohol fatty acid ester include a fatty acid wherein the α-position carbon atom is a quaternary carbon, the lubricity in the presence of difluoromethane refrigerants will tend to be inadequate.

The polyhydric alcohol composing the polyol ester of this embodiment is preferably a polyhydric alcohol with 2-6 hydroxyl groups.

Specific examples of dihydric alcohols (diols) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol and the like. Specific examples of trihydric and greater alcohols include polyhydric alcohols such as trimethylolethane, trimethylolpropane, trimethylolbutane, ditrimethylolpropane, tritrimethylolpropane, pentaerythritol, dipentaerythritol, tripentaerythritol, glycerin, polyglycerin (glycerin 2-3 mers), 1,3,5-pentanetriol, sorbitol, sorbitan, sorbitolglycerin condensation products, adonitol, arabitol, xylitol, mannitol and the like, saccharides such as xylose, arabinose, ribose, rhamnose, glucose, fructose, galactose, mannose, sorbose and cellobiose, and partial etherified forms thereof. Of these, esters of hindered alcohols such as neopentyl glycol, trimethylolethane, trimethylolpropane, trimethylolbutane, ditrimethylolpropane, tritrimethylolpropane, pentaerythritol, dipentaerythritol and tripentaerythritol are preferred, esters of neopentyl glycol, trimethylolethane, trimethylolpropane, trimethylolbutane, pentaerythritol and dipentaerythritol are more preferred, and neopentyl glycol, trimethylolpropane, pentaerythritol and dipentaerythritol are even more preferred for more excellent hydrolytic stability, while pentaerythritol, dipentaerythritol or mixed esters of pentaerythritol and dipentaerythritol are most preferred for particularly excellent compatibility with refrigerants and hydrolytic stability.

Preferred examples of constituent acid components of the polyhydric alcohol fatty acid ester (A) of the invention include the following.

(i) Combinations of 1 to 13 acids selected from among butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid and hexanoic acid, and 1 to 13 acids selected from among 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid and 2-ethyl-3-methylbutanoic acid;

(ii) Combinations of 1 to 13 acids selected from among butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid and hexanoic acid and 1 to 25 acids selected from among 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid and 3-methyl-3-ethylpentanoic acid; and (iii) Combinations of 1 to 13 acids selected from among butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid and hexanoic acid, and 1 to 50 acids selected from among 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid and 2,2-diisopropylpropionic acid.

More preferred examples of constituent acid components of the polyhydric alcohol fatty acid ester of the invention include the following.

(i) Combinations of 2-methylpropanoic acid and 1 to 13 acids selected from among 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid and 2-ethyl-3-methylbutanoic acid;

(ii) Combinations of 2-methylpropanoic acid and 1 to 25 acids selected from among 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid and 3-methyl-3-ethylpentanoic acid; and (iii) Combinations of 2-methylpropanoic acid and 1 to 50 acids selected from among 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid and 2,2-diisopropylpropionic acid.

The content of the polyhydric alcohol fatty acid ester (A) is 50 mass % or greater, preferably 60 mass % or greater, more preferably 70 mass % or greater and even more preferably 75 mass % or greater, based on the total mass of the refrigerating machine oil. The refrigerating machine oil of this embodiment may contain a lubricant base oil other than the polyhydric alcohol fatty acid ester (A) and additives, as explained below, but if the polyhydric alcohol fatty acid ester (A) content is less than 50 mass %, it will not be possible to achieve high levels for both the necessary viscosity and compatibility.

The polyhydric alcohol fatty acid ester (A) in the refrigerating machine oil of this embodiment is used primarily as a base oil. The base oil used for the refrigerating machine oil of this embodiment may be the polyhydric alcohol fatty acid ester (A) alone (that is, a polyhydric alcohol fatty acid ester (A) content of 100 mass %), but a base oil other than the polyhydric alcohol fatty acid ester (A) may also be included in an amount that does not impair the excellence of performance. Base oils other than the polyhydric alcohol fatty acid ester (A) include mineral oils, hydrocarbon-based oils such as olefin polymers alkyldiphenylalkanes, alkylnaphthalenes and alkylbenzenes; and oxygen-containing synthetic oils (hereunder also referred to as "other oxygen-containing synthetic oils") such as esters other than the polyhydric alcohol fatty acid ester (A), including polyol esters, complex esters and alicyclic dicarboxylic acid esters, polyglycols, polyvinyl ethers, ketones, polyphenyl ethers, silicones, polysiloxanes and perfluoroethers.

The oxygen-containing synthetic oil is preferably an ester other than the polyhydric alcohol fatty acid ester (A), or a polyglycol or polyvinyl ether, and most preferably it is a polyol ester other than the polyhydric alcohol fatty acid ester (A). Polyol esters other than the polyhydric alcohol fatty acid ester (A) include esters of fatty acids and polyhydric alcohols such as neopentyl glycol, trimethylolethane, trimethylolpropane, trimethylolbutane, pentaerythritol and dipentaerythritol, and most preferably esters of neopentyl glycol and fatty acids, esters of pentaerythritol and fatty acids and esters of dipentaerythritol and fatty acids.

Preferred neopentyl glycol esters are esters of neopentyl glycol and $C_5$-$C_9$ fatty acid. Specific examples of such neopentyl glycol esters include neopentylglycol di-3,5,5-trimethylhexanoate, neopentylglycol di-2-ethylhexanoate, neopentylglycol di-2-methylhexanoate, neopentyl glycol di-2-ethylpentanoate, esters of neopentyl glycol and 2-methylhexanoic acid and 2-ethylpentanoic acid, esters of neopentylglycol and 3-methylhexanoic acid and 5-methylhexanoic acid, esters of neopentyl glycol and 2-methylhexanoic acid and 2- ethylhexanoic acid, esters of neopentyl glycol and 3,5-dimethylhexanoic acid, 4,5-dimethylhexanoic acid and 3,4-dimethylhexanoic acid, neopentylglycol dipentanoate, neopentylglycol di-2-ethylbutanoate, neopentylglycol di-2-methylpentanoate, neopentylglycol di-2-methylbutanoate, neopentylglycol di-3-methylbutanoate, and the like.

Dipentaerythritol esters are preferably esters of dipentaerythritol and $C_5$-$C_9$ fatty acid. Specific examples of such dipentaerythritol esters include esters of dipentaerythritol with one or more fatty acids selected from among pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid and 2-ethylhexanoic acid.

When the refrigerating machine oil of this embodiment contains an oxygen-containing synthetic oil other than the polyhydric alcohol fatty acid ester (A), the content of the oxygen-containing synthetic oil other than the polyhydric alcohol fatty acid ester (A) is not particularly restricted so long as it does not impair the excellent lubricity and compatibility of the refrigerating machine oil of this embodiment, but when a polyol ester other than the polyhydric alcohol fatty acid ester (A) is added, the amount is preferably less than 50 mass %, more preferably no greater than 45 mass %, even more preferably no greater than 40 mass %, yet more preferably no greater than 35 mass %, even yet more preferably no greater than 30 mass % and most preferably no greater than 25 mass %, based on the total mass of the refrigerating machine oil; and when an oxygen-containing synthetic oil other than a polyol ester is added, the amount is preferably less than 50 mass %, more preferably no greater than 40 mass % and even more preferably no greater than 30 mass % based on the total mass of the refrigerating machine oil. If the addition amount of polyol ester other than a pentaerythritol fatty acid ester or another oxygen-containing synthetic oil is too large, the features of the invention may not be obtained.

A polyol ester other than the polyhydric alcohol fatty acid ester (A) may be a partial ester with a portion of the hydroxyl groups of the polyhydric alcohol remaining as hydroxyl groups without esterification, a complete ester with all of the hydroxyl groups esterified, or a mixture of a partial ester and a complete ester, but the hydroxyl value is preferably no greater than 10 mgKOH/g, even more preferably no greater than 5 mgKOH/g and most preferably no greater than 3 mgKOH/g.

When the refrigerating machine oil and working fluid composition for a refrigerating machine according to this embodiment contains a polyol ester other than the polyhydric alcohol fatty acid ester (A), the polyol ester may contain one type of polyol ester with a single structure, or a mixture of two or more polyol esters with different structures.

The polyol ester other than the polyhydric alcohol fatty acid ester (A) may be an ester of one fatty acid and one polyhydric alcohol, an ester of two or more fatty acids and one polyhydric alcohol, an ester of one fatty acid and two or more polyhydric alcohols, or an ester of two or more fatty acids and two or more polyhydric alcohols.

The refrigerating machine oil of this embodiment may consist entirely of the polyhydric alcohol fatty acid ester (A), or it may comprise the polyhydric alcohol fatty acid ester (A) and another base oil, but the additives mentioned below are further added. The working fluid composition for a refrigerating machine according to this embodiment, as well, may further contain various additives. In the explanation which follows, the additive contents are given based on the total mass of the refrigerating machine oil, and the contents of these components in the working fluid composition for a refrigerating machine are preferably selected to be within the preferred ranges specified below, based on the total amount of the refrigerating machine oil.

In order to further enhance the abrasion resistance and load resistance of the refrigerating machine oil and the working fluid composition for a refrigerating machine according to this embodiment, there may be added one or more phosphorus compounds selected from the group consisting of phosphoric acid esters, acidic phosphoric acid esters, thiophosphoric acid esters, acidic phosphoric acid ester amine salts, chlorinated phosphoric acid esters and phosphorous acid esters. These phosphorus compounds are esters of phosphoric acid or phosphorous acid with alkanols or polyether alcohols, or derivatives thereof.

Specific examples of phosphoric acid esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate and xylenyldiphenyl phosphate.

Acidic phosphoric acid esters include monobutyl acid phosphate, monopentyl acid phosphate, monohexyl acid phosphate, monoheptyl acid phosphate, monooctyl acid phosphate, mononony acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Thiophosphoric acid esters include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate and xylenyldiphenyl phosphorothionate.

Acidic phosphoric acid ester amine salts include amine salts of acidic phosphoric acid esters, and $C_1$-$C_{24}$ and preferably $C_5$-$C_{18}$ primary to tertiary straight-chain or branched alkyl group amine.

Amines composing amine salts of acidic phosphoric acid esters include straight-chain and branched amines such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, tetracosylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, ditetracosylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine and trioleylamine, tritetracosylamine. The amine may be a simple compound or a mixture of two or more different compounds.

As chlorinated phosphoric acid esters there may be mentioned tris(dichloropropyl)phosphate, tris(chloroethyl)phosphate, tris(chlorophenyl)phosphate, and polyoxyalkylene bis [di(chloroalkyl)]phosphate. Phosphorous acid esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite and tricresyl phosphite. Mixtures of the above compounds may also be used.

When the refrigerating machine oil and working fluid composition for a refrigerating machine according to this embodiment contains such phosphorus compounds, the phosphorus compound content is not particularly restricted but is preferably 0.01-5.0 mass % and more preferably 0.02-3.0 mass % based on the total mass of the refrigerating machine oil (the total mass of the base oil and all of the additives). A single phosphorus compound may be used, or two or more may be used in combination.

The refrigerating machine oil and working fluid composition for a refrigerating machine of this embodiment may also contain added terpene compounds for further improved thermal and chemical stability. A "terpene compound" according to the invention is a compound obtained by polymerization of isoprene or a derivative thereof, and isoprene 2-8mers are preferably used. Terpene compounds include, specifically, monoterpenes such as geraniol, nerol, linalool, citrals (including geranial), citronellol, menthol, limonene, terpineol, carvone, ionone, thujone, camphor and borneol, sesquiterpenes such as farnesene, farnesol, nerolidol, juvenile hormone, humulene, caryophyllene, elemen, cadinol, cadinene and tutin, diterpenes such as geranylgeraniol, phytol, abietic acid, pimaradiene, daphnetoxin, taxol and pimaric acid, sestaterpenes such as geranylfarnesene, triterpenes such as squalene, limonin, camelliagenin, hopane and lanosterol, and tetraterpenes such as carotenoids.

Preferred among these terpene compounds are monoterpenes, sesquiterpenes and diterpenes, with sesquiterpenes being more preferred and α-farnesene (3,7,11-trimethyldodeca-1, 3,6,10-tetraene) and/or β-farnesene (7,11-dimethyl-3-methylidenedodeca-1,6,10-triene) being especially preferred. According to the invention, a single type of terpene compound may be used alone, or two or more different ones may be used in combination.

There are no particular restrictions on the content of terpene compounds in the refrigerating machine oil of this embodiment, but it is preferably 0.001-10% by mass, more preferably 0.01-5% by mass and even more preferably 0.05-3% by mass based on the total mass of the refrigerating machine oil. A terpene compound content of less than 0.001% by mass will tend to result in an insufficient improving effect on the thermal and chemical stability, while a content of greater than 10% by mass will tend to result in insufficient lubricity. The content of terpene compounds in the working fluid composition for a refrigerating machine according to this embodiment is preferably selected so as to fall within the aforementioned preferred range based on the total mass of the refrigerating machine oil.

In order to further improve the thermal and chemical stability of the refrigerating machine oil and working fluid composition for a refrigerating machine according to this embodiment, it may contain one or more epoxy compounds selected from among phenyl glycidyl ether-type epoxy compounds, alkyl glycidyl ether-type epoxy compounds, glycidyl ester-type epoxy compounds, allyloxirane compounds, alkyloxirane compounds, alicyclic epoxy compounds, epoxidated fatty acid monoesters and epoxidated vegetable oils.

Specific examples of phenyl glycidyl ether-type epoxy compounds include phenyl glycidyl ethers and alkylphenyl glycidyl ethers. The alkylphenyl glycidyl ethers referred to here may have 1 to 3 $C_1$-$C_{13}$ alkyl groups, preferred examples of which include those with one $C_4$-$C_{10}$ alkyl group such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether and decylphenyl glycidyl ether.

Specific examples of alkyl glycidyl ether-type epoxy compounds include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropanetriglycidyl ether, pentaerythritoltetraglycidyl ether, 1,6-hexanediol diglycidyl ether, sorbitolpolyglycidyl ether, polyalkyleneglycol monoglycidyl ether and polyalkyleneglycol diglycidyl ether.

Specific examples of glycidyl ester-type epoxy compounds include phenylglycidyl esters, alkylglycidyl esters and alkenylglycidyl esters, among which preferred examples include glycidyl-2,2-dimethyl octanoate, glycidyl benzoate, glycidyl acrylate and glycidyl methacrylate.

Specific examples of allyloxirane compounds include 1,2-epoxystyrene and alkyl-1,2-epoxystyrenes.

Specific examples of alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane and 1,2-epoxyeicosane.

Specific examples of alicyclic epoxy compounds include 1,2-epoxycyclohexane, 1,2-epoxycyclopentane, 3,4-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7] oxabicyclo[4.1.0]heptane, 4-(1'-methylepoxyethyl)-1,2-epoxy-2-methylcyclohexane and 4-epoxyethyl-1,2-epoxycyclohexane.

Specific examples of epoxidated fatty acid monoesters include epoxidated esters of $C_{12}$-$C_{20}$ fatty acid and $C_1$-$C_8$ alcohol or phenols or alkylphenols. Most preferably used are butyl, hexyl, benzyl, cyclohexyl, methoxyethyl, octyl, phenyl and butylphenyl esters of epoxystearic acid.

Specific examples of epoxidated vegetable oils include epoxy compounds of vegetable oils such as soybean oil, linseed oil and cottonseed oil.

Preferred among these epoxy compounds are phenyl glycidyl ether-type epoxy compounds, alkyl glycidyl ether-type epoxy compounds, glycidyl ester-type epoxy compounds, and alicyclic epoxy compounds.

When the refrigerating machine oil and working fluid composition for a refrigerating machine according to this embodiment contain such epoxy compounds, the epoxy compound content is not particularly restricted but is preferably 0.01-5.0 mass % and more preferably 0.1-3.0 mass % based on the total mass of the refrigerating machine oil. A single epoxy compound may be used, or two or more may be used in combination.

Conventionally known refrigerating machine oil additives may be included as necessary, in order to further increase the performance of the refrigerating machine oil and working fluid composition for a refrigerating machine of this embodiment. Examples of such additives include phenol-based antioxidants such as di-tert-butyl-p-cresol and bisphenol A, amine-based antioxidants such as phenyl-α-naphthylamine and N,N-di(2-naphthyl)-p-phenylenediamine, anti-wear agents such as zinc dithiophosphate, extreme-pressure agents such as chlorinated paraffins and sulfur compounds, oil agents such as fatty acids, silicone-based and other types of antifoaming agents, metal inactivating agents such as benzotriazoles, acid scavengers such as carbodiimides, viscosity index improvers, pour point depressants, detergent dispersants and the like. Such additives may be used alone or in combinations of two or more. There are no particular restrictions on the content of such additives, but it is preferably no greater than 10 mass % and more preferably no greater than 5 mass % based on the total mass of the refrigerating machine oil.

The kinematic viscosity of the refrigerating machine oil of this embodiment is not particularly restricted, but the 40° C. kinematic viscosity is preferably 20-80 mm$^2$/s, more preferably 25-75 mm$^2$/s and most preferably 30-70 mm$^2$/s. The 100° C. kinematic viscosity is preferably 2-20 mm$^2$/s and more preferably 3-10 mm$^2$/s. If the kinematic viscosity is below this lower limit it will not be possible to obtain the necessary viscosity as a refrigerating machine oil, while if it is above the upper limit, the compatibility with difluoromethane refrigerants will tend to be insufficient.

The volume resistivity of the refrigerating machine oil of this embodiment is also not particularly restricted, but is preferably $1.0 \times \times 10^{12}$ Ω·cm or greater, more preferably $1.0 \times 10^{13}$ Ω·cm or greater and most preferably $1.0 \times 10^{14}$ Ω·cm or greater. High electrical insulating properties will usually be required for use in sealed refrigerating machines. According to the invention, the volume resistivity is the value measured according to JIS C 2101, "Electrical Insulating Oil Test Method", at 25° C.

The moisture content of the refrigerating machine oil of this embodiment is not particularly restricted but is preferably no greater than 200 ppm, more preferably no greater than 100 ppm and most preferably no greater than 50 ppm based on the total mass of the refrigerating machine oil. A lower moisture content is desired from the viewpoint of effect on the thermal and chemical stability and electrical insulating properties of the refrigerating machine oil, especially for use in a closed refrigerating machine.

The acid value of the refrigerating machine oil of this embodiment is also not particularly restricted, but in order to prevent corrosion of metals used in the refrigerating machine or pipings, it is preferably no greater than 0.1 mgKOH/g and more preferably no greater than 0.05 mgKOH/g. According to the invention, the acid value is the value measured based on MS K2501, "Petroleum Products And Lubricant Oils—Neutralization Value Test Method".

The ash content of the refrigerating machine oil of this embodiment is not particularly restricted, but in order to increase the thermal and chemical stability of the refrigerating machine oil and inhibit generation of sludge, it is preferably no greater than 100 ppm and more preferably no greater than 50 ppm. According to the invention, the ash content is the value measured based on JIS K 2272, "Crude Oil/Petroleum Product Ash Content and Sulfated Ash Content Test Method".

The refrigerating machine oil of this embodiment exhibits sufficiently high lubricity and sufficiently high compatibility when used together with difluoromethane refrigerants, and it may be widely used as a refrigerating machine oil for a refrigerating machine for difluoromethane refrigerants. Specific refrigerating machines in which the refrigerating machine oil of this embodiment may be used include cooling devices in room air conditioners, package air conditioners, refrigerators, automobile air conditioners, dehumidifiers, freezers, freezing/refrigerating warehouses, automatic vending machines, showcases, chemical plants and the like, among which refrigerating machines with closed compressors are particularly preferred. The refrigerating machine oil for a difluoromethane refrigerant according to the invention may also be used in a compressor with a reciprocating, rotating or centrifugal system. The refrigerating machine oil of the invention in such a refrigerating machine may be used as a working fluid composition for a refrigerating machine, in combination with a refrigerant, as described hereunder.

Specifically, the working fluid composition for a refrigerating machine according to this embodiment comprises a refrigerating machine oil according to this embodiment as described above, and a refrigerant. There are no particular restrictions on the mixing ratio of the refrigerating machine oil and the refrigerant in the working fluid composition for a refrigerating machine according to this embodiment, but the refrigerating machine oil content will usually be 1-1000 parts by mass and preferably 2-800 parts by mass with respect to 100 parts by mass of the refrigerant.

From the viewpoint of obtaining both sufficiently high lubricity and sufficiently high compatibility which have not been obtainable using conventional refrigerating machine oils, the working fluid composition for a refrigerating machine according to this embodiment exhibits its utility most prominently when it comprises only a difluoromethane refrigerant as the refrigerant component, but it may also comprise an HFC refrigerant other than a difluoromethane refrigerant, an unsaturated fluorinated hydrocarbon (HFO) refrigerant, a trifluoroiodomethane refrigerant, a fluorinated ether-based refrigerant such as a perfluoroether, a non-fluorine-containing ether-based refrigerant such as dimethyl ether, or a natural refrigerant such as ammonia, carbon dioxide ($CO_2$) or a hydrocarbon.

HFC refrigerants other than difluoromethane include $C_1$-$C_3$ and preferably $C_1$-$C_2$ hydrofluorocarbons. Specific examples include trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) 1,1,1,3,3-pentafluorobutane (HFC-365mfc), and mixtures of two or more of the foregoing. These refrigerants may be appropriately selected depending on the purpose of use and the required performance, but preferred examples include HFC-32 alone; HFC-23 alone; HFC-134a alone; HFC-125 alone; HFC-134a/HFC-32 =60-80 mass %/40-20 mass % mixture; HFC-32/HFC-125=40-70 mass %/60-30 mass % mixture: HFC-125/HFC-143a=40-60 mass %/60-40 mass % mixture; HFC-134a/HFC-32/HFC-125=60 mass %/30 mass %/10 mass % mixture; HFC-134a/HFC-32/HFC-125=40-70 mass %/15-35 mass %/5-40 mass % mixture; and HFC-125/HFC-134a/HFC-143a=35-55 mass %/1-15 mass %/40-60 mass % mixture. More specifically, these include HFC-134a/HFC-32=70/30 mass % mixture; HFC-32/HFC-125=60/40 mass % mixture; HFC-32/HFC-125=50/50 mass % mixture (R410A); HFC-32/HFC-125=45/55 mass % mixture (R410B); HFC-125/HFC-143a=50/50 mass % mixture (R507C); HFC-32/HFC-125/HFC-134a=30/10/60 mass % mixture; HFC-32/HFC-125/HFC-134a=23/25/52 mass % mixture (R407C); HFC-32/HFC-125/HFC-134a=25/15/60 mass % mixture (R407E); and HFC-125/HFC-134a/HFC-143a=44/4/52 mass % mixture (R404A).

The unsaturated fluorinated hydrocarbon (HFO) refrigerant is preferably a fluoropropene with 3-5 fluorine atoms, and it is preferably one or a mixture of two or more from among 1,2,3,3,3-pentafluoropropene (HFO-1225ye), 1,3,3,3-tetrafluoropropene (HFO-1234ze), 2,3,3,3-tetrafluoropropene (HFO-1234yy), 1,2,3,3-tetrafluoropropene (HFO-1234ye) and 3,3,3-trifluoropropene (HFO-1243zf). Among these, HFC-32 and HFO-1234yf are preferred as refrigerants, with an HFC-32:HFO-1234yf mass ratio of 95:5 to 50:50. From the viewpoint of refrigerant properties, it is preferred to use one or more selected from among HFO-1225ye, HFO-1234ze and HFO-1234yf.

As hydrocarbon refrigerants there are preferred $C_1$-$C_5$ hydrocarbon, and specific examples include methane, ethylene, ethane, propylene, propane (R290), cyclopropane, normal-butane, isobutane, cyclobutane, methylcyclopropane, 2-methylbutane, normal-pentane, and mixtures of two or more of the foregoing. Preferred among these are refrigerants that are gases at 25° C., 1 atmosphere, such as propane, normal-butane, isobutane, 2-methylbutane, and mixtures thereof.

Specific examples of fluorinated ether-based refrigerants include HFE-134p, HFE-245mc, HFE-236mf, HFE-236me, HFE-338mcf, HFE-365mcf, HFE-245mf, HFE-347mmy, HFE-347mcc, HFE-125, HFE-143m, HFE-134m, HFE-227me and the like, and these refrigerants may be appropriately selected depending on the purpose of use and the required performance.

The refrigerating machine oil of this embodiment will usually be in the form of a working fluid composition for a refrigerating machine in admixture with a refrigerant, in a refrigerating air conditioner. There are no particular restrictions on the mixing proportion of the refrigerating machine oil and refrigerant in the composition, or on the mixing proportion of the refrigerating machine oil and refrigerant in the working fluid composition for a refrigerating machine according to the invention, but the refrigerating machine oil content is preferably 1-500 parts by mass and more preferably 2-400 parts by mass with respect to 100 parts by mass of the refrigerant.

The refrigerating machine oil and working fluid composition for a refrigerating machine of this embodiment is preferably used in an air conditioner or refrigerator with a reciprocating or rotating closed compressor, or in an open or closed automobile air conditioner. The refrigerating machine oil and working fluid composition for a refrigerating machine according to this embodiment may also be suitably used in cooling devices of dehumidifiers, hot water suppliers, freezers, freezing/refrigerating warehouses, automatic vending machines, showcases, chemical plants and the like. The refrigerating machine oil and working fluid composition for a refrigerating machine according to this embodiment may also be suitably used in devices with centrifugal compressors.

The working fluid composition for a refrigerating machine according to this embodiment may be suitably used in refrigerating machines for difluoromethane refrigerants, as mentioned above, and a typical construction of a refrigerant circulation cycle comprising the refrigerating machine is provided with a compressor, a condenser, an expansion mechanism and an evaporator, and if necessary a desiccator.

Examples of compressors include high-pressure container-type compressors housing a motor comprising a rotor and a stator in a sealed container storing a refrigerating machine oil, a rotation axis fitted in the rotor, and a compressor part linked to the motor via the rotation axis, wherein high-pressure refrigerant gas discharged by the compressor part is retained in the sealed container, and low-pressure container-type compressors housing a motor comprising a rotor and a stator in a sealed container storing a refrigerating machine oil, a rotation axis fitted in the rotor, and a compressor part linked to the motor via the rotation axis, wherein high-pressure refrigerant gas discharged by the compressor part is directly ejected out of the sealed container.

As insulating films for use as electrical insulating system materials in motor parts, it is preferred to use crystalline plastic films with glass transition points of 50° C. or higher, and specifically one or more insulating films selected from the group consisting of polyethylene terephthalate, polybutylene terephthalate, polyphenylene sulfide, polyetheretherketone, polyethylene naphthalate, polyamideimide and polyimide films, or composite films comprising a resin layer with a high glass transition temperature covering a film with a low glass transition temperature, because they are resistant to degradation of tensile strength properties and electrical insulation properties. Magnet wires used in motor parts are preferably ones having an enamel coating with a glass transition temperature of 120° C. or higher, such as a single polyester, polyesterimide, polyamide or polyamideimide layer, or an enamel coating that is a composite coating comprising a layer with a low glass transition temperature as the lower layer and a layer with a high glass transition temperature as the upper layer. Enamel wires with composite coatings include those comprising a polyesterimide coated as the lower layer and a polyamideimide coated as the upper layer (AI/EI), and those comprising a polyester coated as the lower layer and a polyamideimide coated as the upper layer (AI/PE).

As desiccants for packing into desiccators, there are preferably used synthetic zeolites comprising silicic acid and alkali aluminate metal complex salts, having a carbon dioxide gas absorption volume of no greater than 1.0%, with a pore size of no greater than 3.3 angstrom and a carbon dioxide gas partial pressure of 250 mmHg at 25° C. Specific examples include XH-9, XH-10, XH-11 and XH-600, trade names of Union Showa, KK.

EXAMPLES

The present invention will now be explained in greater detail based on examples and comparative examples, with the understanding that the invention is in no way limited to the examples.

Examples 1 to 36 and Comparative Examples 1 to 15

Sample oils were prepared for Examples 1 to 36 and Comparative Examples 1 to 15, by combining base oils 1 to 36 and additives 1 to 5, indicated below, in the compositional ratios listed in Tables 1 to 10. The properties of the obtained sample oils are shown in Tables 1 to 10.

(Base Oils)
Base oil 1: Tetraester of pentaerythritol and a fatty acid mixture (2-methylpropanoic acid: 30 mol %, 3,5,5-timethylhexanoic acid: 70 mol %).
Base oil 2: Tetraester of pentaerythritol and a fatty acid mixture (2-methylpropanoic acid: 35 mol %, 3,5,5-trimethylhexanoic acid: 65 mol %).
Base oil 3: Tetraester of pentaerythritol and a fatty acid mixture (2-methylpropanoic acid: 50 mol %, 3,5,5-trimethylhexanoic acid: 50 mol %).
Base oil 4: Tetraester of pentaerythritol and a fatty acid mixture (2-methylpropanoic acid: 60 mol %, 3,5,5-trimethylhexanoic acid: 40 mol %).
Base oil 5: Tetraester of pentaerythritol and a fatty acid mixture (2-methylpropanoic acid: 70 mol %, 3,5,5-trimethylhexanoic acid: 30 mol %).
Base oil 6: Tetraester of pentaerythritol and a fatty acid mixture (2-methylpropanoic acid: 30 mol %, 2-ethylhexanoic acid: 70 mol %).
Base oil 7: Tetraester of pentaerythritol and a fatty acid mixture (2-methylpropanoic acid: 35 mol %, 2-ethylhexanoic acid: 65 mol %).

Base oil 8: Tetraester of pentaerythritol and a fatty acid mixture (2-methylpropanoic acid: 70 mol %, 2-ethylhexanoic acid: 30 mol %).
Base oil 9: Tetraester of pentaerythritol and a fatty acid mixture (2-methylpropanoic acid: 30 mol %, 2-methylhexanoic acid: 35 mol %, 2-ethylpentanoic acid: 35 mol %).
Base oil 10: Tetraester of pentaerythritol and a fatty acid mixture (2-methylpropanoic acid: 70 mol %, 2-methylhexanoic acid: 15 mol %, 2-ethylpentanoic acid: 15 mol %).
Base oil 11: Tetraester of pentaerythritol and a fatty acid mixture (2-methylpropanoic acid: 30 mol %, 3,5,5-trimethylhexanoic acid: 60 mol %, 2-methylbutanoic acid: 10 mol %).
Base oil 12: Tetraester of pentaerythritol and a fatty acid mixture (2-methylpropanoic acid: 60 mol %, 3,5,5-trimethylhexanoic acid: 30 mol %, 2-methylbutanoic acid: 10 mol %).
Base oil 13: Tetraester of pentaerythritol and a fatty acid mixture (2-methylpropanoic acid: 15 mol %, 3,5,5-trimethylhexanoic acid: 35 mol %, 2-methylbutanoic acid: 50 mol %).
Base oil 14: Tetraester of pentaerythritol and a fatty acid mixture (2-methylpropanoic acid: 35 mol %, 3,5,5-trimethylhexanoic acid: 15 mol %, 2-methylbutanoic acid: 50 mol %).
Base oil 15: Tetraester of pentaerythritol and a fatty acid mixture (2-methylpropanoic acid: 20 mol %, 3,5,5-trimethylhexanoic acid: 30 mol %, 2-methylpentanoic acid: 50 mol %).
Base oil 16: Tetraester of pentaerythritol and a fatty acid mixture (2-methylpropanoic acid: 20 mol %, 3,5,5-trimethylhexanoic acid: 30 mol %, 2-ethylpentanoic acid: 25 mol %, 2-methylhexanoic acid: 25 mol %).
Base oil 17: Tetraester of pentaerythritol and a fatty acid mixture (2-methylpropanoic acid: 30 mol %, 2-ethylhexanoic acid: 50 mol %, 2-methylpentanoic acid: 20 mol %).
Base oil 18: Tetraester of pentaerythritol and a fatty acid mixture (2-methylpropanoic acid: 25 mol %, 2-ethylhexanoic acid: 45 mol %, 2-ethylpentanoic acid: 15 mol %, 2-methylhexanoic acid: 15 mol %).
Base oil 19: Triester of trimethylolpropane and a fatty acid mixture (2-methylpropanoic acid: 30 mol %, 3,5,5-trimethylhexanoic acid: 70 mol %).
Base oil 20: Hexaester of dipentaerythritol and a fatty acid mixture (2-methylpropanoic acid: 70 mol %, 3,5,5-trimethylhexanoic acid: 30 mol %).
Base oil 21: Tetraester of pentaerythritol and 2-methylpropanoic acid.
Base oil 22: Tetraester of pentaerythritol and propionic acid.
Base oil 23: Tetraester of pentaerythritol and n-butanoic acid.
Base oil 24: Tetraester of pentaerythritol and 2-ethylhexanoic acid.
Base oil 25: Tetraester of pentaerythritol and a fatty acid mixture (2-ethylhexanoic acid: 50 mol %, 3,5,5-trimethylhexanoic acid: 50 mol %).
Base oil 26: Tetraester of pentaerythritol and 3,5,5-trimethylhexanoic acid.
Base oil 27: Tetraester of pentaerythritol and a fatty acid mixture (propionic acid: 30 mol %, 3,5,5-trimethylhexanoic acid: 70 mol %).
Base oil 28: Tetraester of pentaerythritol and a fatty acid mixture (n-butanoic acid: 25 mol %, 3,5,5-trimethylhexanoic acid: 75 mol %).
Base oil 29: Tetraester of pentaerythritol and a fatty acid mixture (n-butanoic acid: 65 mol %, 3,5,5-trimethylhexanoic acid: 35 mol %).
Base oil 30: Tetraester of pentaerythritol and a fatty acid mixture (2-methylpropanoic acid: 10 mol %, 3,5,5-trimethylhexanoic acid: 90 mol %).
Base oil 31: Tetraester of pentaerythritol and a fatty acid mixture (2-methylbutanoic acid: 90 mol %, 3,5,5-trimethylhexanoic acid: 10 mol %).
Base oil 32: Tetraester of pentaerythritol and a fatty acid mixture (2-methylbutanoic acid: 30 mol %, 3,5,5-trimethylhexanoic acid: 70 mol %).
Base oil 33: Tetraester of pentaerythritol and a fatty acid mixture (2-methylbutanoic acid: 60 mol %, 3,5,5-trimethylhexanoic acid: 40 mol %).
Base oil 34: Tetraester of pentaerythritol and a fatty acid mixture (2-methylpentanoic acid: 30 mol %, 3,5,5-trimethylhexanoic acid: 70 mol %).
Base oil 35: Diester of neopentyl glycol and 2-ethylhexanoic acid.
Base oil 36: Hexaester of dipentaerythritol and a fatty acid mixture (2-ethylhexanoic acid: 50 mol %, 3,5,5-trimethylhexanoic acid: 50 mol %); 40° C. kinematic viscosity: 249.9 mm$^2$/s, 100° C. kinematic viscosity: 19.58 mm$^2$/s.

(Additives)

Additive 1: Tricresyl phosphate
Additive 2: Triphenyl phosphorothionate
Additive 3: Glycidyl-2,2-dimethyl octanoate
Additive 4: p-t-Butylphenyl glycidyl ether
Additive 5: di-t-Butyl-p-cresol Each of the refrigerating machine oils obtained in Examples 1 to 36 and Comparative Examples 1 to 15 was subjected to the following tests.

(Refrigerant Compatibility Test)

Following the "Test method of refrigerant compatibility" for "Refrigerating machine oils" according to JIS K2211, mixtures of 18 g of each refrigerant listed in Tables 1 to 8 and 2 g of sample oil were slowly cooled from 20° C. to -40° C., and the phase separation or opacity temperature of each mixture was evaluated as the phase separation temperature. An evaluation of "<-40" indicates that no phase separation or opacity was observed in the measuring temperature range of the test. An evaluation of "separation" in the tables indicates that phase separation or opacity had already taken place at 20° C.

(Stability Test)

After placing 90 g of sample oil prepared to a moisture content of 1000 ppm, 10 g of difluoromethane refrigerant and an Al, Cu or Fe catalyst in a 200 ml autoclave, the mixture was heated at 175° C. for 168 hours, and the acid value was measured upon completion of the test.

TABLE 1

| | Units | Example 1 | Example 2 | Example 3 | Example 4 | Example 5 | Example 6 |
|---|---|---|---|---|---|---|---|
| Base oil No. | | 1 | 2 | 3 | 4 | 5 | 6 |
| Kinematic viscosity 40° C. | mm$^2$/s | 76.1 | 68.4 | 53.5 | 45.7 | 34.4 | 36.7 |
| 100° C. | mm$^2$/s | 8.81 | 8.18 | 6.95 | 6.27 | 5.28 | 5.49 |
| Viscosity index | | 86 | 84 | 81 | 78 | 77 | 78 |

TABLE 1-continued

|  |  | Units | Example 1 | Example 2 | Example 3 | Example 4 | Example 5 | Example 6 |
|---|---|---|---|---|---|---|---|---|
| Phase separation temperature | HFC-32 | °C. | −5 | −15 | −39 | <−40 | <−40 | −8 |
|  | R410A | °C. | <−40 | <−40 | <−40 | <−40 | <−40 | <−40 |
|  | HFO-1234yf | °C. | <−40 | <−40 | <−40 | <−40 | <−40 | <−40 |
|  | HFC-32/HFO-1234yf = 50/50 (wt %) | °C. | <−40 | <−40 | <−40 | <−40 | <−40 | <−40 |
|  | HFC-32/HFO-1234yf = 75/25 (wt %) | °C. | <−40 | <−40 | <−40 | <−40 | <−40 | <−40 |
|  | HFC-134a | °C. | <−40 | <−40 | <−40 | <−40 | <−40 | <−40 |
|  | R290 | °C. | <−40 | <−40 | <−40 | <−40 | <−40 | <−40 |
|  | $CO_2$ | °C. | <−40 | <−40 | <−40 | <−40 | <−40 | <−40 |
| Stability test |  | mgKOH/g | 0.01 | 0.01 | 0.01 | 0.01 | 0.01 | 0.01 |

TABLE 2

|  |  | Units | Example 7 | Example 8 | Example 9 | Example 10 | Example 11 | Example 12 |
|---|---|---|---|---|---|---|---|---|
| Base oil No. |  |  | 7 | 8 | 9 | 10 | 11 | 12 |
| Kinematic viscosity | 40° C. | mm$^2$/s | 35.2 | 25.9 | 24.7 | 21.4 | 65.2 | 35.4 |
|  | 100° C. | mm$^2$/s | 5.34 | 4.40 | 4.53 | 4.01 | 7.96 | 5.38 |
| Viscosity index |  |  | 76 | 61 | 93 | 70 | 85 | 78 |
| Phase separation temperature | HFC-32 | °C. | −10 | <−40 | −25 | <−40 | −13 | <−40 |
|  | R410A | °C. | <−40 | <−40 | <−40 | <−40 | <−40 | <−40 |
|  | HFO-1234yf | °C. | <−40 | <−40 | <−40 | <−40 | <−40 | <−40 |
|  | HFC-32/HFO-1234yf = 50/50 (wt %) | °C. | <−40 | <−40 | <−40 | <−40 | <−40 | <−40 |
|  | HFC-32/HFO-1234yf = 75/25 (wt %) | °C. | <−40 | <−40 | <−40 | <−40 | <−40 | <−40 |
|  | HFC-134a | °C. | <−40 | <−40 | <−40 | <−40 | <−40 | <−40 |
|  | R290 | °C. | <−40 | <−40 | <−40 | <−40 | <−40 | <−40 |
|  | $CO_2$ | °C. | <−40 | <−40 | <−40 | <−40 | <−40 | <−40 |
| Stability test |  | mgKOH/g | 0.01 | 0.01 | 0.01 | 0.01 | 0.01 | 0.01 |

TABLE 3

|  |  | Units | Example 13 | Example 14 | Example 15 | Example 16 | Example 17 | Example 18 |
|---|---|---|---|---|---|---|---|---|
| Base oil No. |  |  | 13 | 14 | 15 | 16 | 17 | 18 |
| Kinematic viscosity | 40° C. | mm$^2$/s | 36.7 | 22.5 | 36.9 | 41.5 | 31.6 | 32.2 |
|  | 100° C. | mm$^2$/s | 5.62 | 4.09 | 5.73 | 6.20 | 5.06 | 5.17 |
| Viscosity index |  |  | 87 | 64 | 93 | 94 | 79 | 84 |
| Phase separation temperature | HFC-32 | °C. | <−40 | <−40 | −21 | −21 | −18 | −18 |
|  | R410A | °C. | <−40 | <−40 | <−40 | <−40 | <−40 | <−40 |
|  | HFO-1234yf | °C. | <−40 | <−40 | <−40 | <−40 | <−40 | <−40 |
|  | HFC-32/HFO-1234yf = 50/50 (wt %) | °C. | <−40 | <−40 | <−40 | <−40 | <−40 | <−40 |
|  | HFC-32/HFO-1234yf = 75/25 (wt %) | °C. | <−40 | <−40 | <−40 | <−40 | <−40 | <−40 |
|  | HFC-134a | °C. | <−40 | <−40 | <−40 | <−40 | <−40 | <−40 |
|  | R290 | °C. | <−40 | <−40 | <−40 | <−40 | <−40 | <−40 |
|  | $CO_2$ | °C. | <−40 | <−40 | <−40 | <−40 | <−40 | <−40 |
| Stability test |  | mgKOH/g | 0.01 | 0.01 | 0.01 | 0.01 | 0.01 | 0.01 |

TABLE 4

|  |  | Units | Example 19 | Example 20 |
|---|---|---|---|---|
| Base oil No. |  |  | 19 | 20 |
| Kinematic viscosity | 40° C. | mm$^2$/s | 31.9 | 68.1 |
|  | 100° C. | mm$^2$/s | 5.12 | 8.21 |
| Viscosity index |  |  | 82 | 86 |
| Phase separation temperature | HFC-32 | °C. | −12 | <−40 |
|  | R410A | °C. | <−40 | <−40 |
|  | HFO-1234yf | °C. | <−40 | <−40 |
|  | HFC-32/HFO-1234yf = 50/50 (wt %) | °C. | <−40 | <−40 |
|  | HFC-32/HFO-1234yf = 75/25 (wt %) | °C. | <−40 | <−40 |

TABLE 4-continued

|  | Units | Example 19 | Example 20 |
|---|---|---|---|
| HFC-134a | °C. | <−40 | <−40 |
| R290 | °C. | <−40 | <−40 |
| $CO_2$ | °C. | <−40 | <−40 |
| Stability test | mgKOH/g | 0.01 | 0.01 |

TABLE 5

|  |  | Example 21 | Example 22 | Example 23 | Example 24 |
|---|---|---|---|---|---|
| Base oil No. |  | 2 (80 wt %) 25 (20 wt %) | 2 (60 wt %) 25 (40 wt %) | 2 (90 wt %) 36 (10 wt %) | 2 (75 wt %) 35 (25 wt %) |
| Kinematic viscosity | 40° C. | 67.4 | 67.3 | 74.7 | 33.1 |
|  | 100° C. | 8.20 | 8.20 | 8.72 | 5.21 |
| Viscosity index |  | 86 | 87 | 86 | 81 |
| Phase separation temperature | HFC-32 | −12 | −2 | −11 | −15 |
|  | R410A | <−40 | <−40 | <−40 | <−40 |
|  | HFO-1234yf | <−40 | <−40 | <−40 | <−40 |
|  | HFC-32/HFO-1234yf = 50/50 (wt %) | <−40 | −30 | <−40 | <−40 |
|  | HFC-32/HFO-1234yf = 75/25 (wt %) | <−40 | <−40 | <−40 | <−40 |
|  | HFC-134a | <−40 | <−40 | <−40 | <−40 |
|  | R290 | <−40 | <−40 | <−40 | <−40 |
|  | $CO_2$ | <−40 | <−40 | <−40 | <−40 |
| Stability test |  | 0.01 | 0.01 | 0.01 | 0.01 |

TABLE 6

|  |  | Units | Example 25 | Example 26 | Example 27 | Example 28 | Example 29 | Example 30 |
|---|---|---|---|---|---|---|---|---|
| Base oil No. |  |  | 1 | 1 | 1 | 5 | 5 | 5 |
| Additives | Additive 1 | wt % |  |  |  | 1 |  | 1 |
|  | Additive 2 | wt % |  |  |  |  |  | 1 |
|  | Additive 3 | wt % |  |  | 1 | 1 |  |  |
|  | Additive 4 | wt % |  |  |  |  | 1 | 1 |
|  | Additive 5 | wt % | 0.1 | 0.1 | 0.1 | 0.1 | 0.1 | 0.1 |
| Kinematic viscosity | 40° C. | mm²/s | 76.1 | 75.4 | 74.7 | 34.4 | 33.6 | 32.1 |
|  | 100° C. | mm²/s | 8.81 | 8.78 | 8.72 | 5.28 | 5.21 | 5.08 |
| Viscosity index |  |  | 86 | 86 | 86 | 77 | 77 | 77 |
| Phase separation temperature | HFC-32 | °C. | −5 | −5 | −5 | <−40 | <−40 | <−40 |
|  | R410A | °C. | <−40 | <−40 | <−40 | <−40 | <−40 | <−40 |
|  | HFO-1234yf | °C. | <−40 | <−40 | <−40 | <−40 | <−40 | <−40 |
|  | HFC-32/HFO-1234yf = 50/50 (wt %) | °C. | <−40 | <−40 | <−40 | <−40 | <−40 | <−40 |
|  | HFC-32/HFO-1234yf = 75/25 (wt %) | °C. | <−40 | <−40 | <−40 | <−40 | <−40 | <−40 |
|  | HFC-134a | °C. | <−40 | <−40 | <−40 | <−40 | <−40 | <−40 |
|  | R290 | °C. | <−40 | <−40 | <−40 | <−40 | <−40 | <−40 |
|  | $CO_2$ | °C. | <−40 | <−40 | <−40 | <−40 | <−40 | <−40 |
| Stability test |  | mgKOH/g | 0.01 | 0.01 | 0.04 | 0.01 | 0.01 | 0.06 |

TABLE 7

|  |  | Units | Example 31 | Example 32 | Example 33 | Example 34 | Example 35 | Example 36 |
|---|---|---|---|---|---|---|---|---|
| Base oil No. |  |  | 6 | 6 | 6 | 8 | 8 | 8 |
| Additives | Additive 1 | wt % |  |  |  | 1 |  | 1 |
|  | Additive 2 | wt % |  |  |  |  |  | 1 |
|  | Additive 3 | wt % |  |  | 1 | 1 |  |  |
|  | Additive 4 | wt % |  |  |  |  | 1 | 1 |
|  | Additive 5 | wt % | 0.1 | 0.1 | 0.1 | 0.1 | 0.1 | 0.1 |
| Kinematic viscosity | 40° C. | mm²/s | 36.7 | 36.1 | 35.4 | 25.9 | 25.2 | 23.9 |
|  | 100° C. | mm²/s | 5.49 | 5.44 | 5.38 | 4.40 | 4.34 | 4.21 |
| Viscosity index |  |  | 78 | 78 | 78 | 61 | 61 | 61 |
| Phase separation temperature | HFC-32 | °C. | −8 | −8 | −8 | <−40 | <−40 | <−40 |
|  | R410A | °C. | <−40 | <−40 | <−40 | <−40 | <−40 | <−40 |
|  | HFO-1234yf | °C. | <−40 | <−40 | <−40 | <−40 | <−40 | <−40 |

TABLE 7-continued

|  |  | Units | Example 31 | Example 32 | Example 33 | Example 34 | Example 35 | Example 36 |
|---|---|---|---|---|---|---|---|---|
|  | HFC-32/HFO-1234yf = 50/50 (wt %) | °C. | <−40 | <−40 | <−40 | <−40 | <−40 | <−40 |
|  | HFC-32/HFO-1234yf = 75/25 (wt %) | °C. | <−40 | <−40 | <−40 | <−40 | <−40 | <−40 |
|  | HFC-134a | °C. | <−40 | <−40 | <−40 | <−40 | <−40 | <−40 |
|  | R290 | °C. | <−40 | <−40 | <−40 | <−40 | <−40 | <−40 |
|  | $CO_2$ | °C. | <−40 | <−40 | <−40 | <−40 | <−40 | <−40 |
| Stability test |  | mgKOH/g | 0.01 | 0.01 | 0.03 | 0.01 | 0.01 | 0.05 |

TABLE 8

|  |  | Units | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Base oil No. |  |  | 21 | 22 | 23 | 24 | 25 | 26 |
| Kinematic viscosity | 40° C. | mm²/s | Solid | 13.2 | 14.7 | 45.3 | 68.3 | 115.3 |
|  | 100° C. | mm²/s | 3.569 | 3.10 | 3.33 | 6.29 | 8.31 | 11.53 |
| Viscosity index |  |  | — | 89 | 93 | 81 | 88 | 85 |
| Phase separation temperature | HFC-32 | °C. | — | — | — | Separation | Separation | Separation |
|  | R410A | °C. | — | — | — | 2 | 0 | Separation |

TABLE 9

|  |  | Units | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|
| Base oil No. |  |  | 27 | 28 | 29 | 30 | 31 | 32 |
| Kinematic viscosity | 40° C. | mm²/s | 70.8 | 60.8 | 32.6 | 92.4 | Solid | 69.3 |
|  | 100° C. | mm²/s | 8.61 | 7.80 | 5.41 | 9.99 | 3.93 | 8.39 |
| Viscosity index |  |  | 91 | 91 | 99 | 85 | — | 88 |
| Phase separation temperature | HFC-32 | °C. | 0 | 5 | 0 | Separation | — | 15 |
|  | R410A | °C. | −35 | −25 | −32 | Separation | — | −29 |

TABLE 10

|  |  | Units | Comp. Ex. 13 | Comp. Ex. 14 | Comp. Ex. 15 |
|---|---|---|---|---|---|
| Base oil No. |  |  | 33 | 34 | 35 |
| Kinematic viscosity | 40° C. | mm²/s | 32.5 | 68.1 | 7.3 |
|  | 100° C. | mm²/s | 5.23 | 8.58 | 2.02 |
| Viscosity index |  |  | 87 | 96 | 56 |
| Phase separation temperature | HFC-32 | °C. | 1 | 2 | — |
|  | R410A | °C. | −29 | −32 | — |

INDUSTRIAL APPLICABILITY

According to the invention it is possible to provide a refrigerating machine oil that allows high levels to be achieved for refrigerant compatibility, lubricity and low-temperature flow properties when it is used together with difluoromethane refrigerants, unsaturated fluorinated hydrocarbons and the like, as well as a working fluid composition for a refrigerating machine using the same.

The invention claimed is:

1. A refrigerating machine oil comprising an ester obtained by esterification of only a polyhydric alcohol and a fatty acid mixture comprising at least one $C_4$-$C_6$ fatty acid and at least one $C_7$-$C_9$ branched fatty acid,
    wherein the molar ratio of the at least one $C_4$-$C_6$ fatty acid and the at least one $C_7$-$C_9$ branched fatty acid in the fatty acid mixture is between 15:85 and 90:10,
    the at least one $C_4$-$C_6$ fatty acid comprises 2-methylpropanoic acid, and
    the total amount of the at least one $C_4$-$C_6$ fatty acid and the at least one $C_7$-$C_9$ branched fatty acid in the fatty acid mixture is at least 20 mol %.

2. The refrigerating machine oil according to claim 1, wherein the ratio of 2-methylpropanoic acid in the at least one $C_4$-$C_6$ fatty acid is at least 20 mol %.

3. The refrigerating machine oil according to claim 1, wherein the at least one $C_4$-$C_6$ fatty acid is 2-methylpropanoic acid.

4. The refrigerating machine oil according to claim 1, wherein the polyhydric alcohol is pentaerythritol and the 40° C. kinematic viscosity of the refrigerating machine oil is 20 to 80 mm²/s.

5. The refrigerating machine oil according to claim 1, wherein the at least one $C_7$-$C_9$ branched fatty acid is 3,5,5-trimethylhexanoic acid.

6. A working fluid composition for a refrigerating machine, comprising the refrigerating machine oil according to claim 1 and a difluoromethane refrigerant.

7. A working fluid composition for a refrigerating machine comprising the refrigerating machine oil according to claim 1 and an unsaturated fluorinated hydrocarbon refrigerant.

8. A working fluid composition for a refrigerating machine comprising the refrigerating machine oil according to claim 1, a difluoromethane refrigerant and an unsaturated fluorinated hydrocarbon refrigerant.

9. A working fluid composition for a refrigerating machine comprising the refrigerating machine oil according to claim 1, a difluoromethane refrigerant and an unsaturated fluorinated hydrocarbon refrigerant, wherein the mass ratio of the difluoromethane refrigerant and the unsaturated fluorinated hydrocarbon refrigerant is between 95:5 and 50:50.

* * * * *